United States Patent
Schmid et al.

(10) Patent No.: US 7,482,035 B2
(45) Date of Patent: Jan. 27, 2009

(54) METHOD OF COATING A SUBSTRATE BY A THERMAL APPLICATION OF THE COATING MATERIAL

(75) Inventors: Richard K. Schmid, Melville, NY (US); Arno Refke, Mellingen (CH); Gerard Barbezat, Opfikon (CH); David Hawley, Kings Park, NY (US)

(73) Assignee: Sulzer Metco AG, Wohlen (CH)

( * ) Notice: Subject to any disclaimer, the term of this patent is extended or adjusted under 35 U.S.C. 154(b) by 771 days.

(21) Appl. No.: 10/835,358

(22) Filed: Apr. 28, 2004

(65) Prior Publication Data
US 2004/0234687 A1 Nov. 25, 2004

(30) Foreign Application Priority Data
May 23, 2003 (EP) .................. 03405368

(51) Int. Cl.
*C23C 14/54* (2006.01)
(52) U.S. Cl. .................. 427/10; 427/571; 427/579; 427/294
(58) Field of Classification Search .............. 427/248.1, 427/571, 8, 10, 579, 294
See application file for complete search history.

(56) References Cited

U.S. PATENT DOCUMENTS

| | | | | |
|---|---|---|---|---|
| 3,900,762 | A | * | 8/1975 | Sheer et al. ............. 315/111.01 |
| 5,175,020 | A | * | 12/1992 | Doellein et al. ............. 427/569 |
| 5,356,673 | A | * | 10/1994 | Schmitt et al. ............. 427/446 |
| 5,449,799 | A | * | 9/1995 | Terfloth et al. ............. 556/112 |
| 5,571,332 | A | * | 11/1996 | Halpern ................. 118/723 HC |
| 5,744,117 | A | * | 4/1998 | Wilkinson et al. .......... 423/563 |
| 5,853,815 | A | | 12/1998 | Muehlberger |
| 6,348,237 | B2 | * | 2/2002 | Kohler et al. ............... 427/489 |

(Continued)

FOREIGN PATENT DOCUMENTS

DE  3435748 A1  4/1986

(Continued)

OTHER PUBLICATIONS

Oh, Seung-Min, et al., "Preparation of Ultra-fine Alumina Powders by D.C. Plasma Jet". Korean J. Chem. Eng., 17(3), pp. 299-303 (2000).*

(Continued)

*Primary Examiner*—Bret Chen
(74) *Attorney, Agent, or Firm*—Townsend and Townsend and Crew LLP

(57) ABSTRACT

A method of coating a substrate by thermal application of the coating materials using a plasma jet is disclosed. The properties of the plasma jet are determined by controllable process parameters. The coating material and a process gas mixture are injected into the plasma jet where the coating material is partly or completely evaporated depending on the controllable parameters. The phases of the coating material present in vapor and, optionally, condensed form are at least partly deposited on the substrate. A diagnostic measuring method determines the relative proportion of vapor and/or condensed phase for the coating material transported in the plasma jet. The controllable process parameters are set with respect to desired values using such measured data. Regulation of direct manufacture of the coating, particularly a multi-layer coating system, is carried out with respect to these desired values, which correspond to a predetermined vapor or condensed phase proportion.

21 Claims, 1 Drawing Sheet

U.S. PATENT DOCUMENTS 6,365,016 B1 * 4/2002 Iacovangelo et al. ... 204/192.38
6,645,438 B1 * 11/2003 Dubrovsky ................. 422/151

FOREIGN PATENT DOCUMENTS

DE   3623044 A1   2/1987
JP   01107442   11/1990
WO   WO 02/19455 A2   3/2002

OTHER PUBLICATIONS

Lehtinen, T., et al., "Correlations Between In-Flight Particle Concentrations and Coating Properties in Atmospheric Plasma Spraying of Alumina," *Proceedings of the National Thermal Spray Conference*, Oct. 7, 1996.

* cited by examiner

METHOD OF COATING A SUBSTRATE BY A THERMAL APPLICATION OF THE COATING MATERIAL

BACKGROUND OF THE INVENTION

The invention relates to a hybrid method for the coating of a substrate by a thermal application of the coating materials. Thin films with specific material structures and with layer thicknesses in the range from 1-800 μm can be produced with the method.

The substrate is coated in that a coating material is applied using a thermal process jet. The process jet forms a space through which plasma flows and in which the coating material is transported together with a process gas mixture. The plasma is produced by means of an electrical gas discharge, electromagnetic induction or microwaves. An advantageous method in which a particular process jet is produced is described in U.S. Pat. No. 5,853,815. A so-called LPPS thin film (LPPS=low pressure plasma spraying) is applied to the substrate using this method.

A conventional LPPS plasma spraying method is modified in a technical process manner with the LPPS thin film process. The coating material is injected into the plasma in powder form and with a delivery gas. A strong spatial expansion of the plasma results in a "defocusing" of the powder jet. The powder is dispersed to form a cloud and is melted due to a high enthalpy of the plasma and is, optionally, partly evaporated. The coating material arrives at a widely expanded surface of the substrate in a uniform distribution. A thin layer is deposited whose layer thickness is less than 10 μm and which forms a dense cover due to the uniform distribution. A thicker coating with special properties can be produced directly by a multiple application of thin layers.

Such a coating can be used as a functional layer. A functional layer, which as a rule includes different part layers, can be applied to a base body which forms the substrate. For example, for gas turbines (stationary turbines or airplane engines), which are operated at high process temperatures, the vanes are coated with a first single-layer or multi-layer part film such that the substrate becomes resistant to hot gas corrosion. A second coating—of ceramic material—applied to the first part layer forms a heat insulating layer. A method is described in EP-A-1 260 602 for the production of such a heat insulating layer system in which a plurality of individual layers (barrier layer, protective layer, heat insulating layer and/or smoothing layer) can be applied by a changing setting of controllable process parameters in one working cycle. The process parameters are the pressure and enthalpy of the plasma, the composition of the process gas and the composition and the form of application of the coating material.

SUMMARY OF THE INVENTION

It is an object of the present invention to provide a method for the coating of a substrate by a thermal application of the coating, in particular by a combination of thermal spraying and reactive vapor phase deposition, with which a coating can specifically be produced with a specific material structure—both a homogeneous, heterogeneous and a multi-layer coating.

In the method for the coating of a substrate, a hybrid coating method is carried out with a thermal process jet which makes it possible to combine the properties of a thermal spraying method with those of a vapor phase deposition. The properties of the process jet are defined by controllable process parameters, in particular by the parameters of pressure, enthalpy, composition of a process gas mixture and composition and form of application of a coating material. The coating material is partly or completely evaporated in dependence on the controllable parameters. The phases of the coating material present in vapor form and, optionally, condensed form, i.e. in solid or liquid form, are at least partly deposited on the substrate. The relative proportion of the vapor and/or of the condensed phase for the coating material transported in the process jet is determined by a diagnostic measuring method. The controllable process parameters are set in relation to desired values using measured data gained in this manner. A regulation for the direct manufacture of the coating, in particular of a multi-layer coating system, is carried out with respect to these desired values, which correspond to a predetermined vapor proportion or to a proportion of a condensed phase.

The method in accordance with the invention is a hybrid coating method in which vapor phases and condensed phases of the coating material are applied. It combines the properties and possibilities of a thermal coating method with those of a vapor phase deposition, in particular of a reactive deposition. The phases in the process jet are monitored using a measuring apparatus and the hybrid process is regulated via a setting of suitable process parameters. A controlled setting of the desired layer structure on the substrate is made possible by the regulation of the state of the coating material in the process jet.

BRIEF DESCRIPTION OF THE DRAWINGS

The invention will be described in the following with reference to the drawing.

DESCRIPTION OF THE PREFERRED EMBODIMENTS

Figure 1:
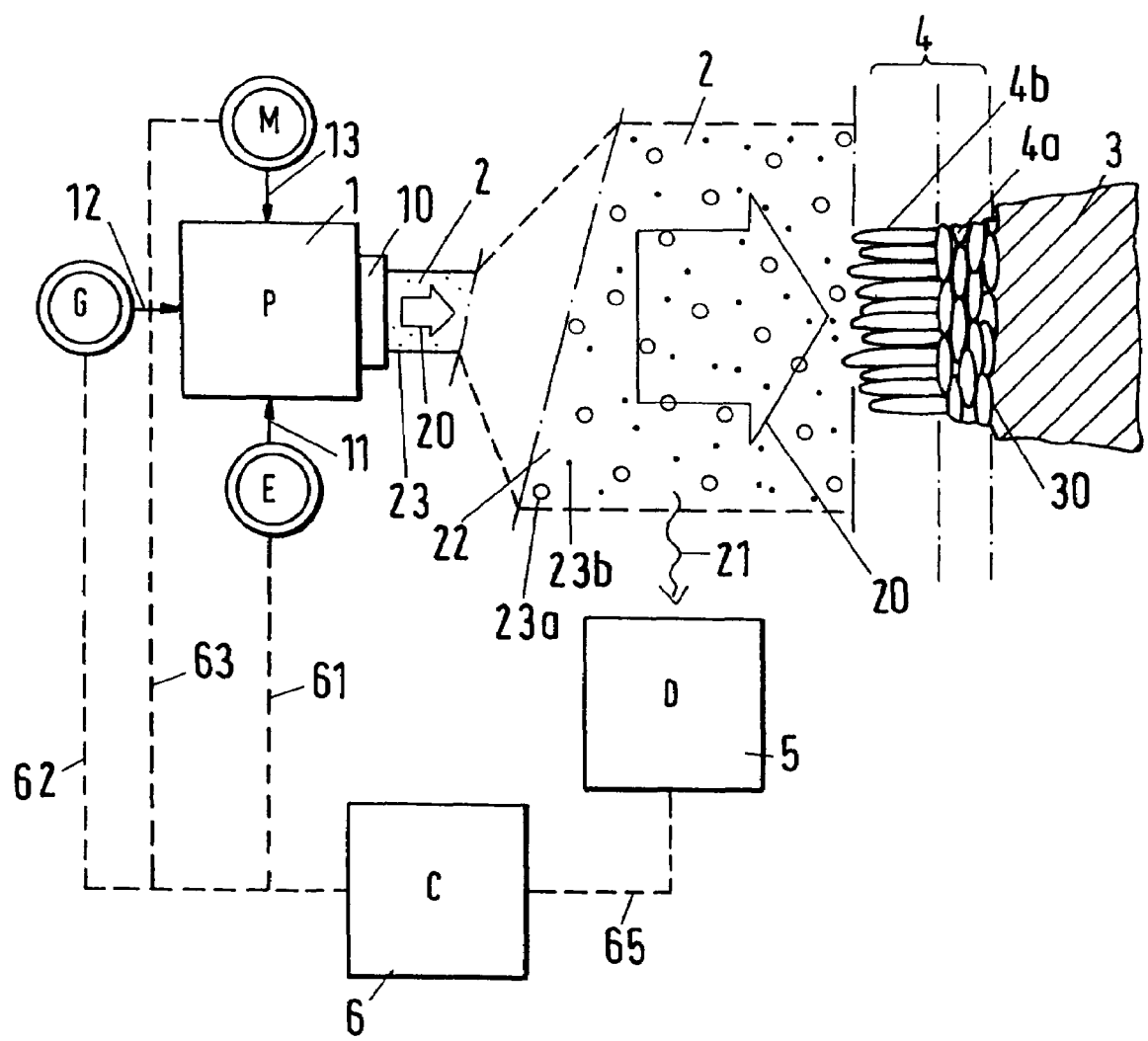
FIG. 1 shows a schematic illustration of a plant with which the method in accordance with the invention is carried out.

A thermal coating method is used with the plant shown which is based, for example, on the LPPS thin film process and in which the coating material is applied to a surface 30 of a substrate 3. The plant includes an apparatus 1 in which a process jet 2 is produced using a known process P from a coating material M, a process gas mixture G and electrical energy E. The in-feed of these components E, G and M is symbolized by the arrows 11, 12 and 13. The produced process jet 2 emerges through a nozzle 10 and transports the coating material M in the form of a powder jet or precursor in which material particles 23 are dispersed in a plasma 22. This transport is symbolized by the arrow 20. The process jet 2 is shown in enlarged form in the right-hand half of FIG. 1. The material particles 23 are powder particles as a rule; however, they can also consist of a liquid or dispersion. The morphology of a layer system 4 deposited on the substrate 3 depends on process parameters and in particular on the coating material M, on the process enthalpy and on the temperature of the substrate 3.

The coating material M is advantageously injected into a plasma defocusing the material jet and is partly or completely melted therein at a low process pressure which is less than 10,000 Pa. If a plasma with a sufficiently high specific enthalpy is produced, a substantial proportion of the material particles 23 change into the vapor phase. A structured layer can thus be created which is a part layer 4b of the layer system 4. Structured layers can be created which have lamellar, columnar or mixed material structures. The variation of the structures is substantially influenced and controllable by the coating conditions, in particular by process enthalpy, operating pressure in the coating chamber and precursor. The layer system 4 in FIG. 1 has a two-layer film structure. As a rule, more than two part layers are deposited. A base layer 4a of the system layer 4 has a lamellar structure which results at a lower enthalpy such as is used in conventional thermal layer sprayed layers. In the second part layer 4b, elongate corpuscles form an anisotropic microstructure. The corpuscles, which are aligned standing perpendicular to the substrate surface 30, are bounded with respect to one another by low-material transition regions.

The process jet 2 has properties which are defined by controllable process parameters. Photons 21 are emitted by the plasma 22 which allow conclusions on the properties of the process jet 2. The material particles 23 carried along in the process jet 2 are partly or completely evaporated in dependence on the controllable parameters. The material particles 23 finally form a condensed phase 23a, i.e. a phase present in solid or liquid form, and a vapor phase 23b. In accordance with the invention, the relative proportion of vapor 23b and/or of condensed phase 23a is determined by a diagnostic measurement process D using a device 5.

The controllable process parameters are set with respect to desired values using the measured data gained by the process D. These desired values correspond to a vapor proportion or to a proportion of a condensed phase which has to be observed for the direct layer manufacture. A regulation C with respect to the desired values is carried out using a device 6 to which the measured data are transmitted via a signal lead 65 in order to produce the special layer structure which should, for example, be homogeneous or heterogeneous, in particular multi-layer. The process parameters are set via signal leads 61, 62 and 63.

For the diagnosis of the process jet 2, an optical measuring method D is advantageously used in which in particular the vapor proportion is determined by means of a spectroscopic or pyrometric process. The proportion of the condensed phase 23a, which is present in the form of a plurality of droplets and/or particles, can also be determined by means of a scattered light measurement using an auxiliary light source, in particular a laser. Two or more measuring methods D can also be combined.

The form of application in which the coating material M is injected into the process stream 2 (arrow 13) can be a powder and/or a liquid, in particular a suspension, and/or a gas, in particular a gaseous precursor, with optionally different starting materials being able to be injected simultaneously using a plurality of injectors.

Metallic and/or non-metallic substances, in particular oxide ceramic substances, can be used for the coating material M. The metallic substances are pure metals or metallic alloys, in particular materials from the group of MCrAlY alloys, where M=Ni, Co, CoNi or Fe, or intermetallic phases, for example NiAl compounds. The oxide ceramic materials are oxides of Zr, Al, Ti, Cr, Ca, Mg, Si, Ti, Y, La, Ce, Sc Pr, Dy, Gd or combinations of these chemical elements.

A reactive gas can be fed to the process gas mixture G and includes, for example, a hydrocarbon compound, oxygen and/or nitrogen and reacts with one part of the coating material M in the process jet 2. The compounds arising, which are in particular oxides, nitrides, borides, silicides, carbides or aluminides, are deposited on the substrate 3 with the non-reacted part of the coating material M.

The forming of the layer structure 4 is influenced by applying an electrical potential between the burner electrodes and the substrate 3 (so-called "biasing"). Either a positive or a negative bias is possible. The formation of the layer structure 4 can be influenced by the formation of a transmitted light arc or by an additional pre-heating of the substrate.

The process jet 2 is a heat source. An additional heat source can be used. A heat sink can moreover be provided. The temperature of the substrate 3 can be controlled or regulated by influencing a heat input by the heat source or a heat removal by the heat sink. The application of the coating material M can thus be carried out at predetermined temperatures matched to the process conditions.

The substrate material can consist of organic and/or inorganic material and, optionally, be present as a composite material. The substrate 3 can consist at least partly of a metallic material, in particular of an alloy, and/or of a ceramic material. The substrate 3 is formed, for example, by the base body of a turbine vane. Or it can be present as a component of a fuel cell.

The method in accordance with the invention can be used, for example, to produce a coating with a very heterogeneous material structure. Such a material structure is in particular a mixed structure which includes a porous base structure and non-reacted material particles embedded therein.

The invention claimed is:

1. A method for depositing a coating onto a substrate using a plasma jet whose properties are defined by controllable process parameters, wherein coating material and a process gas mixture are injected into the plasma jet where the coating material is partly or completely evaporated in dependence on the controllable parameters; the coating material in the plasma jet is present in vapor phase or in vapor and condensed phases, and one or both phases of the coating material are at least partly deposited on the substrate, and the relative proportion of vapor or condensed phase for the coating material transported in the plasma jet is measured by a diagnostic measuring method; wherein an optical measuring process is used for the diagnosis of the plasma jet in which the vapor proportion is measured by means of a spectroscopic or pyrometric process, or the proportion of the condensed phase, which is present in the form of a plurality of droplets, particles or a combination thereof, is measured by means of a scattered light measurement using an auxiliary light source; and wherein the relative proportion of vapor or condensed phase of coating material in the plasma jet is set by setting the controllable process parameters with respect to set-point values of the process parameters, which correspond to a predetermined vapor proportion or to a proportion of condensed phase, for the direct manufacture of the coating by deposition of coating material from the plasma phase onto the substrate.

2. The method of claim 1, wherein the controllable process parameters are operating pressure in the coating chamber and precursor, enthalpy, composition of the process gas mixture and composition and form of application of the coating material.

3. The method of claim 2, wherein the form of application in which the coating material is injected into the plasma jet is at least one of a powder, a liquid, a suspension, a gas or a gaseous precursor.

4. The method of claim 3, wherein different coating materials are injected simultaneously.

5. The method of claim 1, wherein a multi-layer coating system comprising a plurality of individual layers is deposited using predetermined settings of controllable process parameters for each individual layer.

6. The method of claim 5, wherein the formation of the layer structure is influenced by application of an electrical potential between burner electrodes and the substrate.

7. The method of claim 1, wherein the plasma is produced by means of electrical gas discharge, electromagnetic induction or microwaves.

8. The method of claim 1, wherein a laser is used as a scattered light source for measuring the proportion of the condensed phase.

9. The method of claim 1, wherein the coating materials comprise oxide ceramic substances, the oxide ceramic substances being oxides of Zr, Al, Ti, Cr, Ca, Mg, Si, Ti, Y, La, Ce, Sc, Pr, Dy, Gd or combinations thereof.

10. The method of claim 1, wherein the coating materials comprise metallic substances, the metallic substances being pure metals or metallic alloys.

11. The method of claim 10, wherein the metallic alloy is one of MCrAlY alloys, where M=Ni, Co, CoNi or Fe.

12. The method of claim 10, wherein the metallic alloy is an intermetallic phase in the form of NiAl compounds.

13. The method of claim 1, wherein a reactive gas is fed to the process gas mixture.

14. The method of claim 13, wherein the reactive gas includes hydrocarbon compounds, oxygen or nitrogen, and reacts with one part of the coating material in the plasma jet; wherein the compounds created are deposited onto the substrate with the non-reacted part.

15. The method of claim 14, wherein the compounds created are oxides, nitrides, borides, silicides, carbides or aluminides.

16. The method of claim 1, wherein the coating material comprises a compound of the type $M_xO_yN_z$, where M is a metal such that the compound is thermodynamically stable.

17. The method of claim 16, wherein the metal is one of Zr, Al, Cr, Ti or Ta.

18. The method of claim 1, wherein an additional heat source or a heat sink is used to carry out the application of the coating material at predetermined temperatures matched to the process conditions, with the temperature of the substrate being controlled or regulated by changing a heat input by the heat source or of the heat sink.

19. The method of claim 1, wherein the substrate consists of organic or inorganic material, or is a composite material.

20. The method of claim 1, wherein the substrate is a turbine vane or a component of a fuel cell.

21. The method of claim 1, wherein the plasma jet is produced at a low process pressure that is less than 10,000 Pa.

* * * * *